Sept. 20, 1971 D. J. SINNOTT 3,605,998

ELECTRICAL APPARATUS FOR COMPARING DROPPED MATRICES WITH REQUESTED MATRICES OF A LINE-CASTING MACHINE

Original Filed Dec. 29, 1967

3 Sheets-Sheet 1

INVENTOR.
DAVID J. SINNOTT

BY

ATTORNEY

ELECTRICAL APPARATUS FOR COMPARING DROPPED MATRICES WITH REQUESTED MATRICES OF A LINE-CASTING MACHINE

Original Filed Dec. 29, 1967

3 Sheets-Sheet 2

INVENTOR.
DAVID J. SINNOTT

BY

[signature]

ATTORNEY

INVENTOR.
DAVID J. SINNOTT
BY
Norman R. Holland
ATTORNEY

United States Patent Office 3,605,998
Patented Sept. 20, 1971

3,605,998
ELECTRICAL APPARATUS FOR COMPARING DROPPED MATRICES WITH REQUESTED MATRICES OF A LINE-CASTING MACHINE

David J. Sinnott, Ringwood, N.J., assignor to Star-New Era, Inc., South Hackensack, N.J.

Continuation of application Ser. No. 694,732, Dec. 29, 1967. This application Mar. 11, 1970, Ser. No. 18,004
Int. Cl. B41b 9/06
U.S. Cl. 199—18 8 Claims

ABSTRACT OF THE DISCLOSURE

Logic circuits are connected to an automatic apparatus for operating a line-casting machine from a coded tape and connected to a photocell for sensing the dropping of the matrices in response to the automatic equipment. Signals from a photocell assembly count the dropped matrices and signals from the electronic equipment are impressed on a selection circuit so that one signal is held while the other signal is impressed on an up/down counter. The count detector is provided to read the counter to determine if all the matrices requested are dropped. If a proper comparison is not made, the machine is stopped. The comparison may be made at the end of each word and at the end of each line. An electronic unit is connected to the means sensing the dropping of the matrices to create a simulated signal when two overlapping matrices provide for a single interruption of the light beam projected to the photocell.

CROSS REFERENCE

This application is a continuation of my copending application Ser. No. 694,732 filed Dec. 29, 1967 and now abandoned.

BACKGROUND OF THE INVENTION

This invention relates to automatic operation of line-casting machines from coded tapes, and is directed particularly to the comparison of coded requests for matrices by the tape and the delivery of requested matrices by the magazine for assemblage.

In one of the prior systems electrical components are used to count the requests for matrices on a manually operated line-casting machine with the matrices dropped for insertion into the assemblage.

In another prior system the matrices supplied and the matrices requested are compared on completion of each assemblage before the line is sent away to be cast. The number of matrices requested and the number of matrices supplied are compared. If fewer matrices are supplied than requested, the line-casting machine is stopped and the assemblage corrected. This method has the disadvantage that if a matrix is skipped at the beginning of the assemblage, it is not detected until the assemblage is completed. The assemblage must be discarded, delaying the completion of the type. In the case of long lines of type a long delay in the setting of the type occurs, and large numbers of matrices are removed from the magazine which are not used in forming an acceptable line of type.

The foregoing systems are not readily adapted to line-casting machines that are operated by electronic equipment from coded tapes.

SUMMARY OF THE INVENTION

Signals from a photocell counting the dropped matrices and the signals from automatic electronic equipment operating the line-casting machine are impressed on a counter input selection circuit to hold one signal while the other signal is impressed on the two bit binary up/down counter with the matrix signals counting in one direction and the matrix requesting signals counting in the other direction. A count detector is connected to the output of the counter to continuously read the counter and is also connected to the automatic electronic equipment to read the counter at the end of each word and each line to determine if all the matrices requested are dropped for assemblage. The output of the count detector is connected to the automatic equipment to stop operations if proper comparisons are not made.

An object of the invention is to match the signals for matrices created by the coded tape with the signals created by the matrices supplied to detect the omission of a requested matrix after each word.

Another object of the invention is to promptly detect the failure of a line-casting machine to supply a matrix requested by a coded tape.

Another object of the invention is to provide a matrix detection system with means to electronically detect matrices overlapping as two matrices.

Another object of the invention is to detect and stop the tape when a spaceband is jammed or improperly inserted.

Other and further objects of the invention will be obvious upon an understanding of the illustrative embodiment about to be described, or will be indicated in the appended claims, and various advantages not referred to herein will occur to one skilled in the art upon employment of the invention in practice.

DETAILED DESCRIPTION

Figure 1A:
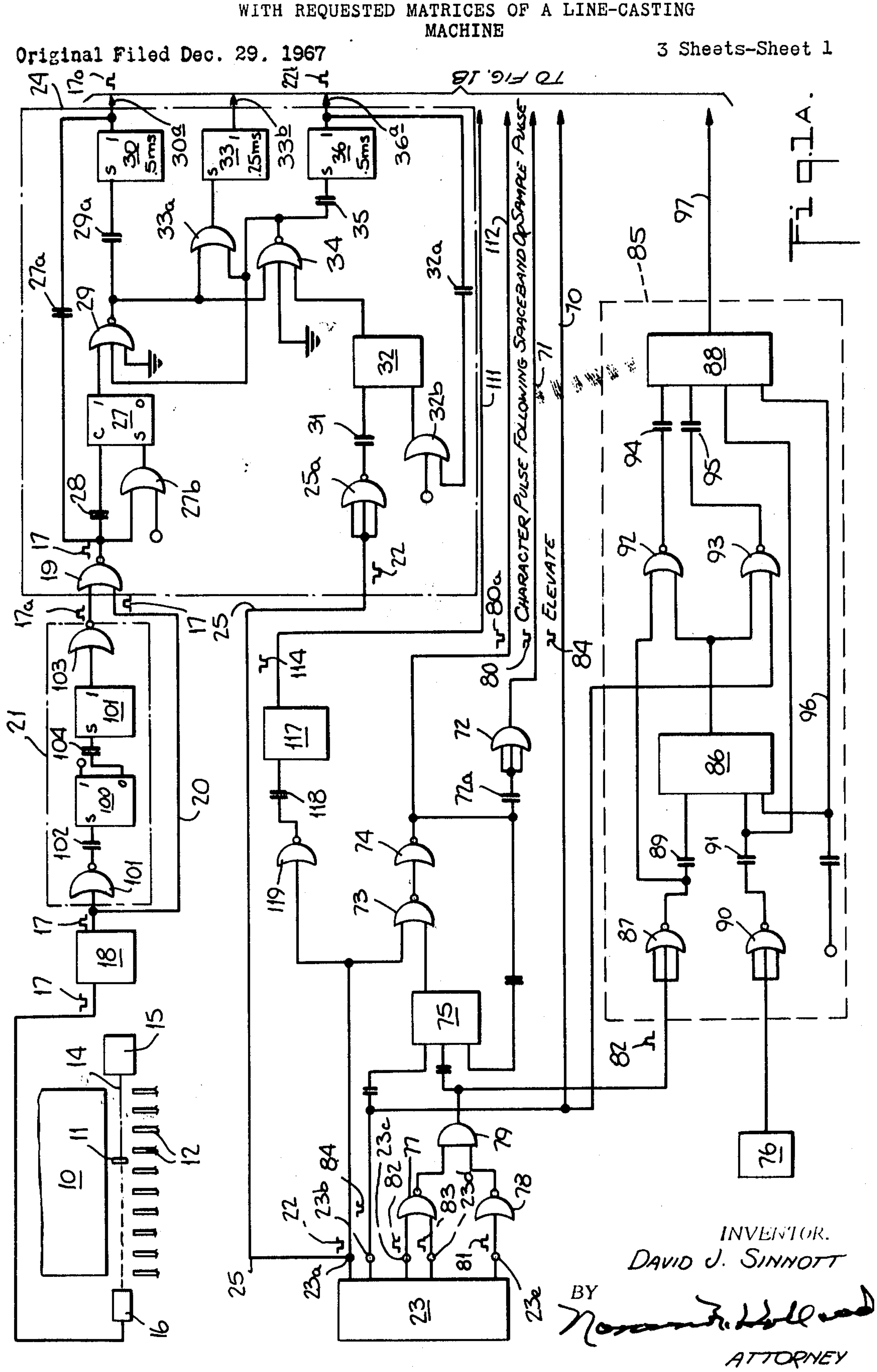
FIGS. 1A, 1B fragmentarily illustrate the electrical components of the apparatus.
Figure 2:
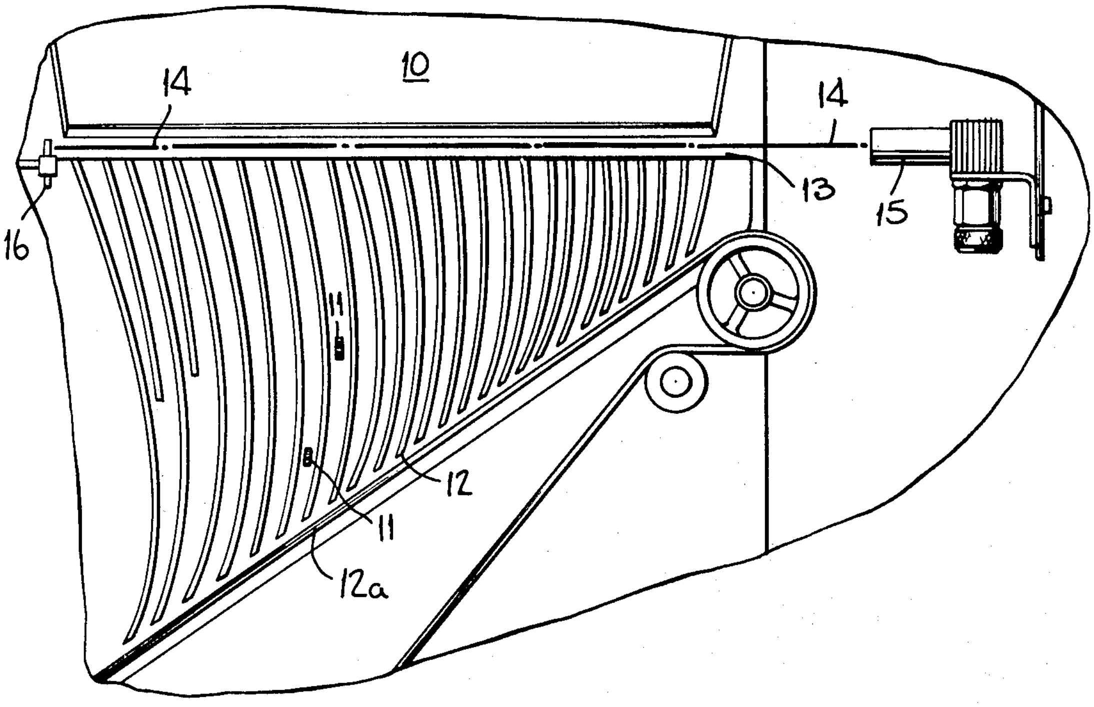
FIG. 2 is a fragmentary front view of a line-casting machine illustrating the matrix magazine and supply chutes with a lamp and photoelectric cell for detecting matrices.
Figure 3:
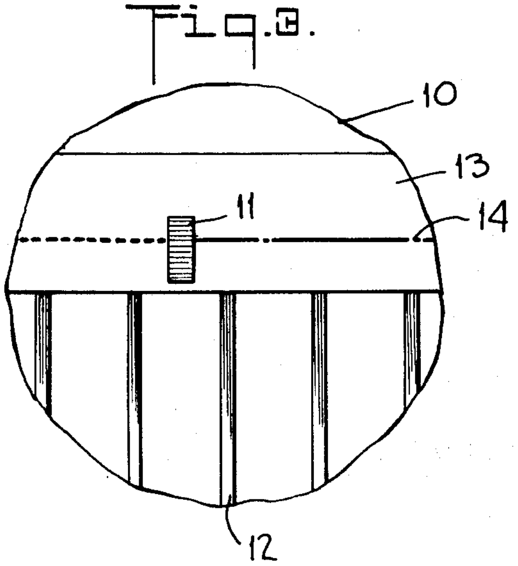
FIG. 3 is an enlarged fragmentary view of the space between the matrix magazine and supply chutes with a single matrix intercepting the beam of light.

In the conventional line-casting machines (FIGS. 2 to 4) the matrices 11 are dropped from a magazine 10 through a space 13 into the guides 12 for delivery to the belt 12*a*. For sensing the discharge of the matrices 11 a light 15 projects a narow beam of focused light 14 through the space 13 onto a photoelectric cell 16 at the opposite end of the space 13 from the light 15. The matrices 11 in passing through the space 13 intercept and interrupt the light beam 14. The photoelectric cell 16 on interruption of the light beam 14 creates a mat signal or pulse 17 (FIG. 1A) to indicate that a matrix 11 has been discharged from the magazine 10 in response to the code on the tape in the automatic setting apparatus 23.

The matrices 11 are dropped in response to commands from a tape in the automatic setting apparatus 23. The automatic setting apparatus 23 also provides a character pulse 22. This pulse 22 is only provided by the automatic setting apparatus 23 when the command on the tape requests a matrix 11, and is not provided when the command on the tape requests a line-casting machine function or requests a spaceband. The character pulse 22 appears as a negative pulse at terminal 23*a* and thence by line 25 to NOR gate 25*a*. In addition the automatic setting apparatus 23 provides an RCC (reset command code) pulse 81, a spaceband pulse 82 and an add-thin-space pulse 83.

Figure 1B:
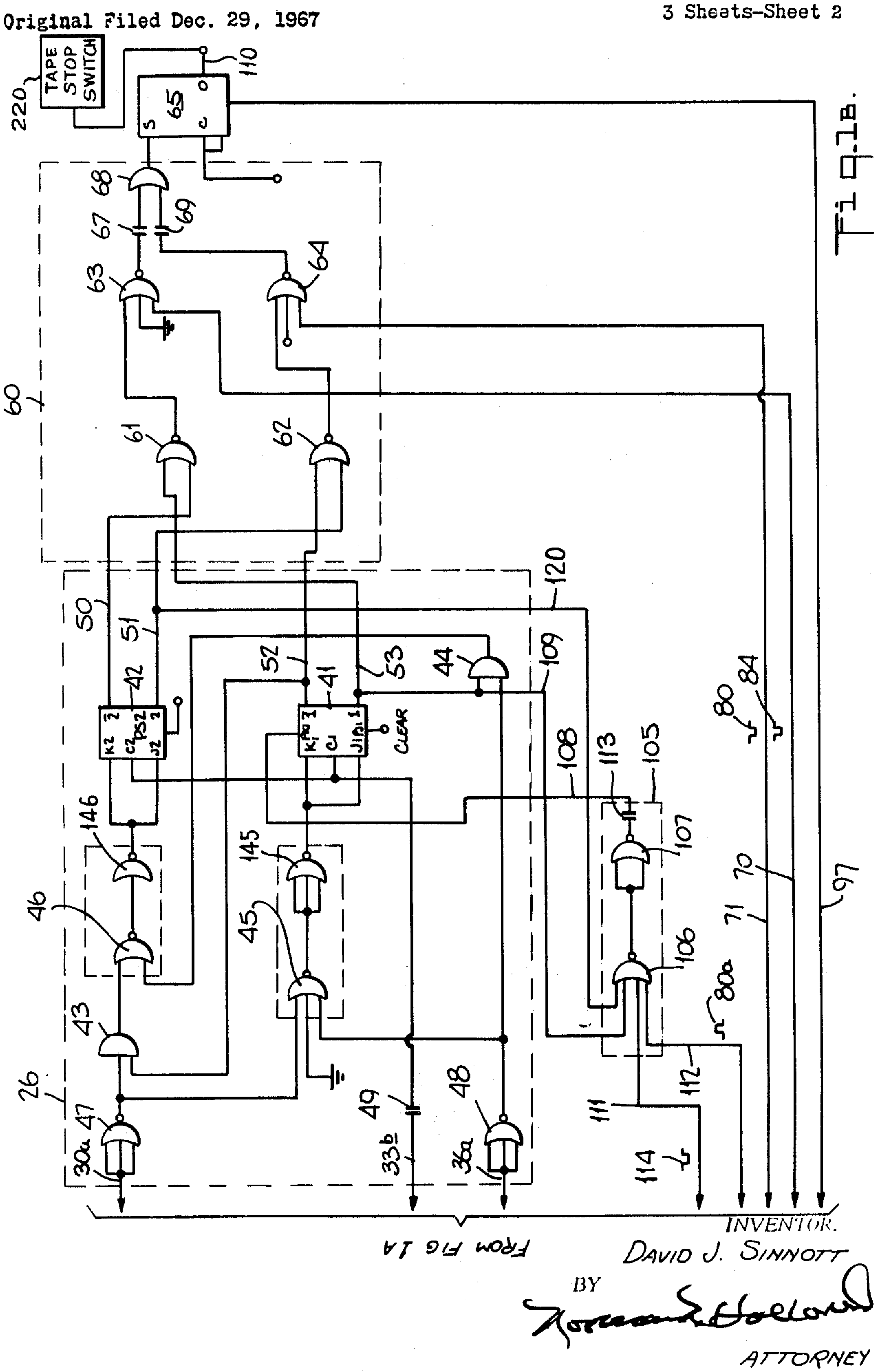

This is more fully described in the U.S. Pat. Nos. 3,207,845 and 3,208,040. These pulses 81, 82 and 83 are positive and appear at terminals 23*e*, *c*, and *d*, respectively. A negative elevate pulse 84 is provided by the automatic setting apparatus 23 at terminal 23*b*. The mat pulse 17 and the character pulse 22 are fed to a standard two-binary bit up/down counter 26 (FIG. 1B) to compare the character pulses 22 requesting matrices 11 and the mat pulses 17 indicating the release of matrices 11 by the magazine 10.

The mat pulses 17 are fed to an amplifier and squarer 18. The output of the squarer 18 is connected directly to the NOR gate 19 by the line 20 and through the matrix overlap circuit 21 to the NOR gate 19. The matrix overlap circuit 21, later described herein, corrects the situation illustrated in FIG. 4 when successive matrices 11 overlap to produce a single interruption of the light beam 14. The overlap circuit 21 produces a second simulated mat pulse 17*a* in order to count the second overlapping matrix 11.

In order to prevent nearly simultaneous application of a mat pulse 17 and character pulse 22 to the counter 26 with the possible loss of one of the pulses 17 and 22 a counter 26 input selection control circuit 24 is provided to sequentially impress the mat pulses 17 and the character pulses 22 onto the counter 26. The sequence of presentation to the counter 26 is determined by the time of receipt of a mat pulse 17 or character pulse 22 by the circuit 24.

The mat pulse 17 is entered into switch 27 through capacitor 28 turning the switch 27 on, thereby recording the fact that a matrix 11 has been released from the magazine 10. The output of the switch 27 is applied through NOR gate 29, capacitor 29*a* and pulse generator 30 to the counter 26. The output of the pulse generator 30 is fed back through capacitor 27*a* to OR gate 27*b* for resetting the switch 27 for the next mat pulse 17. The NOR gate 29 is partially activated by switch 32 through the NOR gate 34. This records the presence of a character pulse 22. The NOR gate 29 will then prevent the mat pulse 17 from being entered into the counter 26 until a character pulse 22 has been entered in the counter 26. The character pulse 22 blocks the mat pulse 17 if applied to switch 32 prior to the application of the mat pulse 17 to the switch 27. The character pulse 22 is applied from the automatic setting apparatus 23 to the switch 32 through the NOR gate 25*a* and capacitor 31.

The output of the NOR gate 29 triggers a .5 ms. pulse generator 30 which outputs pulse 17*a* on line 30*a* and a .25 ms. pulse generator 33 which has an output on line 33*b*. The .25 ms. pulse generator 33 enables the counter 26 to receive a count, and at the end of the .25 ms. pulse permits the output of the .5 ms. pulse generator 30 to be entered into the counter 26. This 0.5 ms. pulse causes the counter 26 to be counted down or in a negative direction.

The character pulse 22 is applied from the character pulse switch 32 to the counter 26 through a NOR gote 34 and pulse generator 36 of .5 ms. by means of capacitor 35 in a similar fashion as the mat pulse switch 27 output generates pulse 22*b* which is applied to the counter 26. The output of the generator 36 is fed back through the capacitor 32*a* and the OR gate 32*b* to reset the switch 32. The output of NOR gate 29 blocks the application of the character pulse 22 to generator 36 if the mat pulse 17 is applied to switch 27 prior to the application of the character pulse 22 to switch 32. These pulses 22 when applied to the counter 26, however, cause it to count up or in a positive direction. The temporary storage of the mat and character pulses 17 and 22, respectively, prior to entry to the pulse generators 30, 33, and 36 prevents the loss of either pulse 17 or 22 irrespective of the sequence of entry of the pulses 17 and 22. The .25 ms. pulse generator 33 is actuated by the NOR gates 29 or 34 through the OR gate 33*a*.

The counter 26 is a two bit binary counter which counts 0, 1, 2, 3 decimally. The decimal output of the counter 26 at any particular count is 0, 1, 2 or 3 which are 00, 01, 10 and 11, respectively, in the binary number system.

The counter 26 has two flip-flops 41, 42. The flip-flop 41 has output terminals $\bar{1}$ and 1, input terminals K1, C1 and J1 and clearing input terminals PK1 and PJ1. The flip-flop 42 has output terminals $\bar{2}$ and 2, input terminals K2, and C2 and in addition input clearing terminal J2. The output lines 50, 51, 52, 53 are connected to the output terminals $\bar{2}$, 2, $\bar{1}$, 1, respectively. The counter 26 is connected to the matrix pulse generator 30 by the line 30*a* and NOR gate 47, to delay pulse generator 33 by the line 33*b* and to the character pulse generator 36 by the line 36*a*. The output of the counter 26 is connected to the non-zero count detector 60 by the lines 50, 51, 52, 53.

The non-zero count detector 60 tests the output of the counter 26 at the end of each word and at the end of each line to determine if a matrix 11 has dropped in response to each character pulse 22 generated by the automatic setting apparatus 23 or that additional matrices 11 are dropped over that requested by the automatic setting apparatus 23. If there is a discrepancy the non-zero count detector 60 creates a signal turning the switch 65 on. A signal appears on line 110 which is connected to the automatic setting apparatus 23 for applying the signal to the tape stop switch 220.

At the beginning of the assemblage the count is zero and at the end of the assemblage the count is zero showing that all of the matrices 11 have dropped in response to the requesting character pulse 22. The testing of the count is initiated by the elevate signal 84. The testing at the end of each word is initiated by the sample pulse 80 which is created by the character pulse 22 following the spaceband at the end of the word. The counter 26 is at the count of 1 when the test is made. Thus when the counter 26 has a count of 1 no signal is generated by the non-zero count detector 60 on sampling at the end of a word. The switch 65 is not turned on and the coded tape continues to operate the automatic setting apparatus 23.

The non-zero count detector 60 has two input NOR gates 61, 62 and two output NOR gates 63, 64. The output NOR gates 63 and 64 are connected to the switch 65 through the capacitors 67, 69 and the OR gate 68. The NOR gates 61, 63 monitor at the end of each assemblage and the NOR gates 62 and 64 monitor at the end of each word. The NOR gate 61 is connected by the output lines 50 and 53 to the output terminals $\bar{2}$ and 1 of the flip-flops 42 and 41, respectively. The NOR gate 62 is connected by the output lines 51 and 52 to the output terminals 2 and $\bar{1}$ of the flip-flops 42 and 41, respectively. The line 70 with the elevate pulse 84 is connected to the input of the NOR gate 63 and the line 71 with the sample pulse 80 is connected to the input of the NOR gate 64. The application of these respective signal pulses 84 and 80 sets the non-zero count detector 60 to sample the output of the counter 26. When the count is zero at the end of an assemblage there is no output signal at the NOR gate 63. The NOR gate 64 also does not have any output since there is no sample pulse 80. Hence, the switch 65 is not actuated. However, at any other count a signal will be produced at NOR gate 63 to actuate the switch 65 through the OR gate 68. When the count is 1 at the end of a word there is no output signal at the NOR gate 64 and since there is no elevate pulse 84 there is no output from the NOR gate 63. Thus the switch 65 is not actuated. However, at any other count a signal will be produced at the NOR gate 63 to actuate switch 65 and change the tape switch 220 to the off state.

As to the details of the counter 26 the flip-flops 41 and 42 are set to count up by the character pulses 22 applied over line 36*a* or count down by the matrix pulses 17 applied over line 30*a*. The C1 and C2 inputs on the flip-flops 41 and 42 are connected by line 33*b* and capacitor 49 to the pulse generator 33 to activate and prepare the flip-flops 41 and 42 to receive an input signal. At the commencement of an assemblage the flip-flops 41 and 42 are at a zero count with the terminal $\overline{2}$ positive, terminal 2 negative, terminal $\overline{1}$ negative and terminal 1 positive. The flip-flop 42 is in the zero state and the flip-flop 41 is in the one state. A character pulse 22 applied to the counter 26 by the line 36*a* passes through the NOR gate 48 to the NOR gates 45 and 145 to change the state of the flip-flop 41 from one to zero. Since the output terminal 1 is positive a signal will be applied by the AND gate 43 to the NOR gates 46 and 146 to apply a signal to the flip-flop 42 changing it from the zero state to the one state. The count is one. If a second character pulse 22 is received the flip-flop 41 is changed from the zero state to the one state, but the flip-flop 42 is not changed since the terminal 1 is negative and no signal is applied by the AND gate 43 to the NOR gate 46. The count is two. If a third character pulse 22 signal is received the flip-flop 41 is changed from the one state to the zero state and since terminal 1 is positive the AND gate 43 changes the flip-flop 42 from the one state to the zero state. The count is three.

Considering the count down with the counter 26 at one the matrix pulse 17 is passed through the AND gate 44 to the NOR gates 46 and 146 to change the flip-flop 42 from the one state to the zero state through the NOR gates 46 and 146. The flip-flop 41 is actuated through the NOR gates 45 and 145 to change it from the zero state to the one state. Thus the counter 26 is returned to the zero count which means that a matrix 11 has been dropped to correspond to the character pulse 22. If an additional matrix 11 is dropped without a character pulse 22 the matrix pulse 17 is not applied to the NOR gate 46 since the terminal $\overline{1}$ is negative. The matrix pulse 17 is, however, applied to the flip-flop 41 through the NOR gates 45 and 145 to change the flip-flop 42 from the one state to the zero state. If another matrix pulse 17 is applied the flip-flop 42 is changed from the zero state to the one state, since the terminal $\overline{1}$ is positive and the flip-flop 41 is changed from the zero state to the one state. Thus the counter 26 adds or subtracts over the range of 0, 1, 2 and 3.

Any non-zero number recorded by the counter 26 at the end of an assembly is assumed to mean that a matrix 11 was not released when requested by the tape. Theoretically any non-zero number would also mean that a matrix 11 was released from the magazine 10 without being requested by the tape. However, in operation any non-zero number is assumed to mean that more character pulses 22 were added into the counter 26 than mat pulses 17 were subtracted from the counter 26.

The NOR gate 63 to which the elevate signal 84 is applied will be fully activated only when the counter 26 is recording a non-zero number. The output of this NOR gate 63 is applied through the capacitor 67 and/or gate 68 to the switch 65, turning that switch 65 on and thus turning the tape stop switch 220 off preventing the tape from being moved forward and also preventing the line from being elevated.

The other NOR gate 64 is fully activated at the end of a word by the character pulse 22 following a spaceband or sample pulse 80 the counter 26 recording 0, 2 or 3, that is, any count other than 1. The output of NOR gate 64 is applied to the switch 65 through the capacitor 69 and OR gate 68, causing the tape stop switch 220 to turn off. A count of 1 in counter 26 indicates that equal numbers of character pulses 22 and mat pulses 17 have been generated rather than the count 0. This is due to the nature of the sample pulse 80 applied to NOR gate 64.

As mentioned above the sample pulse 80 is generated by the character pulse 22 following a spaceband. A spaceband is not dropped from the magazine 10 and hence will not cause a mat pulse 17 to be generated. Therefore, by the time the next character pulse 22 is generated the counter 26 should be recording the number 0, since all the character pulses 22 and mat pulses 17 will have had time to have been entered into the counter 26 and the net count is zero. The next character pulse 22, however, will be entered into the counter 26 and the sample pulse 80 will be made in the counter 26 without a mat pulse 17 being applied to the counter 26 to reduce it to the count of 0.

The sample pulse 80 is provided through the OR gate 72 as a result of a signal through the NOR gates 73 and 74 coupled through capacitor 72*a*. The NOR gate 73 is made high by the output of switch 75 and the character pulse 22. Switch 75 is turned on by the RCC signal 81 through NOR gate 78 and the spaceband signal 82 generated by the tape and applied through NOR gate 77. The two signals 81 and 82 go through AND gate 79 before being applied to switch 75. This turns the switch 75 on. Switch 75 will also be turned on by the add-thin-space delay signal 83 being combined with the RCC pulse 81 by NOR gates 77 and 78 and AND gate 79. The add-thin-space delay signal 83 is generated when an unprogrammed tape is used with an electrical apparatus automatically sensing a justifiable assemblage and reassembling a line when rejected as unjustifiable. The add-thin-space delay signal 83 occurs during reassembly after each spaceband is requested by the tape.

The reset terminal PK1 of the counter flip-flop 41 is connected by line 108 to the reset circuit 105 comprising NOR gates 106, 107 and capacitor 113. The input NOR gate 106 is connected by lines 109, 120 to the 1 and 2 terminals of the counters 41 and 42 and by lines 111, 112 to the switch 117 and NOR gate 74, respectively. A negative character pulse 80*a* following a spaceband and a negative signal 114 are applied to the reset circuit 105 to enable the circuit 105 and reset the flip-flop 41 to a zero state from a one state for the next word. The negative signal 114 is created by the character pulse 22 applied to the switch 117 through NOR gate 119 and capacitor 118.

The spaceband circuit 85 stops the tape if a spaceband fails to be released by the line-casting machine when requested by the tape. The release of a spaceband is not detected by the photoelectric cell 16 because a spaceband does not travel in the same path to the assembly carriage as a matrix 11. The release of a spaceband is, therefore, detected by the operation of the spaceband switch 76. The spaceband pulse 82 represents the command on the tape requesting that a spaceband be placed into a line. This pulse 82 is applied to switch 86 through NOR gate 87 and capacitor 89 turning the switch 86 on. The spaceband switch 76 should be activated shortly thereafter by a falling spaceband and a signal will be applied through NOR gate 90 and capacitor 91 to turn or reset the switches 86 and 88 off. The output of the switch 86 is connected to the switch 88 through NOR gates 92, 93 and capacitors 94, 95. The NOR gate 92 is connected to the output of NOR gate 87 to positively activate NOR gate 92 and NOR gate 93 is connected to the elevate terminal 23*b* of the automatic setting apparatus 23. The switches 86 and 88 may be reset by the application of the reset signal to line 96. If the automatic setting apparatus 23 spaceband switch 76 is not activated, the spaceband was not released. Switch 88 will, therefore, not be turned off. The output of the switch 88 is applied over line 97 to the tape stop control switch 65 (FIG. 1B) of the automatic setting apparatus 23, causing the tape to stop.

The mat pulse 17 generated by the photoelectric cell is negative and applied to amplifier 18. The amplifier 18 is a Schmidt trigger which effectively squares the matrix pulse 17 at its input and has a square positive output. This pulse 17 is applied to the NOR gate 19 over line 20 and to the matrix overlap detector 21.

Figure 4:
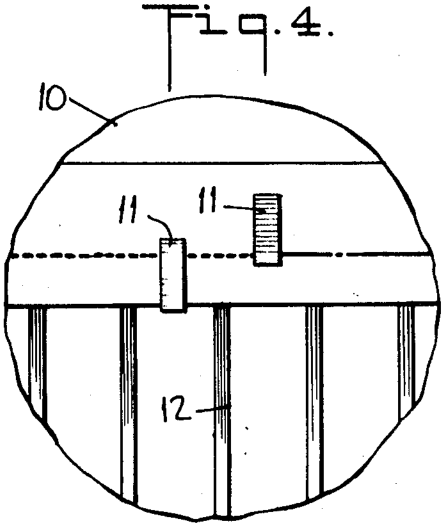
FIG. 4 is similar to FIG. 3 and illustrates overlapping matrices intercepting the beam of light.

Two matrices 11 may be released from the magazine 10 in such rapid succession that the light beam 14 is broken only once (FIG. 4). The duration of the beam break in this case is longer than for the case where a single matrix 11 is released from the magazine 10. This condition is called overlap. When this condition occurs, an overlap circuit 21 is brought into play to generate a second pulse 17*a* which will be sent to the counter 26 to record the additional matrix 11. Under overlap conditions when two matrices 11 are released by the magazine 10 so that only a single break in the light beam 14 occurs, the mat pulse 17 will have a longer time length and a succeeding matrix pulse 17 will not be created to inform that a successive matrix 11 has been released. Thus there will be no subtraction count in the counter 26 to remove the addition count of the command releasing the succeeding and overlapping matrix 11.

The switch 100 of the matrix overlap detector 21 is triggered every time a mat pulse 17 is received through NOR gate 101 and capacitor 102. Under single non-overlapping conditions the switch 100 is still firing after the mat pulse 17 is removed from the input of the amplifier 18. Under overlap conditions the switch 100 stops firing while the pulse 17 is still present at the input of the amplifier 18 and fires the switch 101 through the condenser 104. This is impressed on the NOR gate 19 through the NOR gate 103 and a second simulated mat pulse 17*a* is created to indicate the presence of the second and overlapping matrix 11.

It is thus seen from the foregoing description that the character pulse 22 and the matrix pulse 17 are continuously being compared by adding the character pulse 22 to the counter 26 and subtracting the corresponding mat pulse 17 to produce a zero count. The sequence of entry of the character pulse 22 and the mat pulse 17 into the counter 26 does not affect the comparison. If a character pulse 22 is impressed upon the counter 26 and no corresponding mat pulse 17 is impressed, then the counter 26 is in a non-zero count state. The sample pulse 80 created by the spaceband signal 82 and the character pulse 22 following the spaceband signal 82 activates the non-zero count detector 60 to determine the count state of the counter 26 at the end of each word, and if a matrix 11 is absent from the assemblage the switch 65 is turned off which turns the tape stop switch 220 off. The elevate signal 84 activates the non-zero count detector 60 to determine if a matrix 11 is missing in the assemblage at the end of the line. The spaceband circuit 85 checks the insertion of spacebands into the assemblage so that an assemblage will not be cast that is short a spaceband.

Having thus described my invention, I claim:

1. Electrical apparatus for detecting the absence of a requested matrix from assemblage in a line casting machine comprising a magazine for storing matrices, means for producing character pulses corresponding to requests for matrices, means responsive to the character pulses to release a matrix from said magazine, means to sense said released matrix to provide a corresponding mat pulse, electrical counting means responsive to said character and mat pulses, said counting means being provided with comparative count means for adding character pulses and for subtracting mat pulses to provide a comparative count, means connected to said counting means for sensing the comparative count between said character and mat pulses, means for producing a word end signal and an assemblage end signal, said comparative count sensing means being responsive to said word end signals and assemblage end signals, and means responsive to said comparative count sensing means for providing a signal indicating the failure of the addition and subtraction functions of the counting means to result in zero count, wherein said means for sensing and providing a mat pulse includes means for producing a simulated mat pulse on an overlapping delivery of two matrices to an assemblage for counting the succeeding overlapping matrix.

2. Electrical apparatus as set forth in claim 1 wherein said comparative count means comprises two flip flops and said counting means further comprises two interconnected blocking means for delaying the application of the output of one flip-flop while the other flip-flop is delivering an output signal for a sequential delivery of the mat and character pulses.

3. Electrical apparatus as set forth in claim 2 wherein a first delay circuit is connected to said blocking means to receive said mat and character pulses and delay the delivery to said comparative count means, and second and third delay circuits connected separately to said blocking means to separately deliver mat and character pulses to said comparative count means with a greater delay time than said first delay means.

4. Electrical apparatus as set forth in claim 1 wherein said comparative count means includes means to provide a count of 0, 1, 2, 3.

5. Electrical apparatus as set forth in claim 1 wherein said counting means comprises signal storage means for said means for producing character pulses and said means for sensing and providing pulses to separately store said character and mat pulses and sequentially deliver said character and mat pulses to said comparative count means.

6. Electrical apparatus as claimed in claim 1 wherein means are provided to sense a spaceband signal to cause the comparative count sensing means to be activated.

7. Electrical apparatus as set forth in claim 1 wherein said means for producing a simulated mat pulse comprises an overlap matrix circuit to compensate for release of matrices from the magazine which pass the matrix sensing means in overlapping relationship.

8. Electrical apparatus as claimed in claim 1 wherein said means to sense said release matrix is a photoelectric system.

References Cited

UNITED STATES PATENTS

| | | |
|---|---|---|
| 2,820,543 | 1/1958 | Elliott. |
| 2,874,825 | 2/1959 | Rossetto. |
| 2,880,853 | 4/1959 | Greene et al. |
| 2,955,703 | 10/1960 | Shaffstall. |
| 3,139,178 | 6/1964 | Krause et al. |
| 3,300,034 | 1/1967 | Kleboe et al. |

ERNEST T. WRIGHT, Jr., Primary Examiner